Jan. 4, 1938.　　　　P. M. CARLISLE　　　　2,104,293
BRICK AND TILE MACHINE
Filed Nov. 13, 1936　　　　4 Sheets—Sheet 1
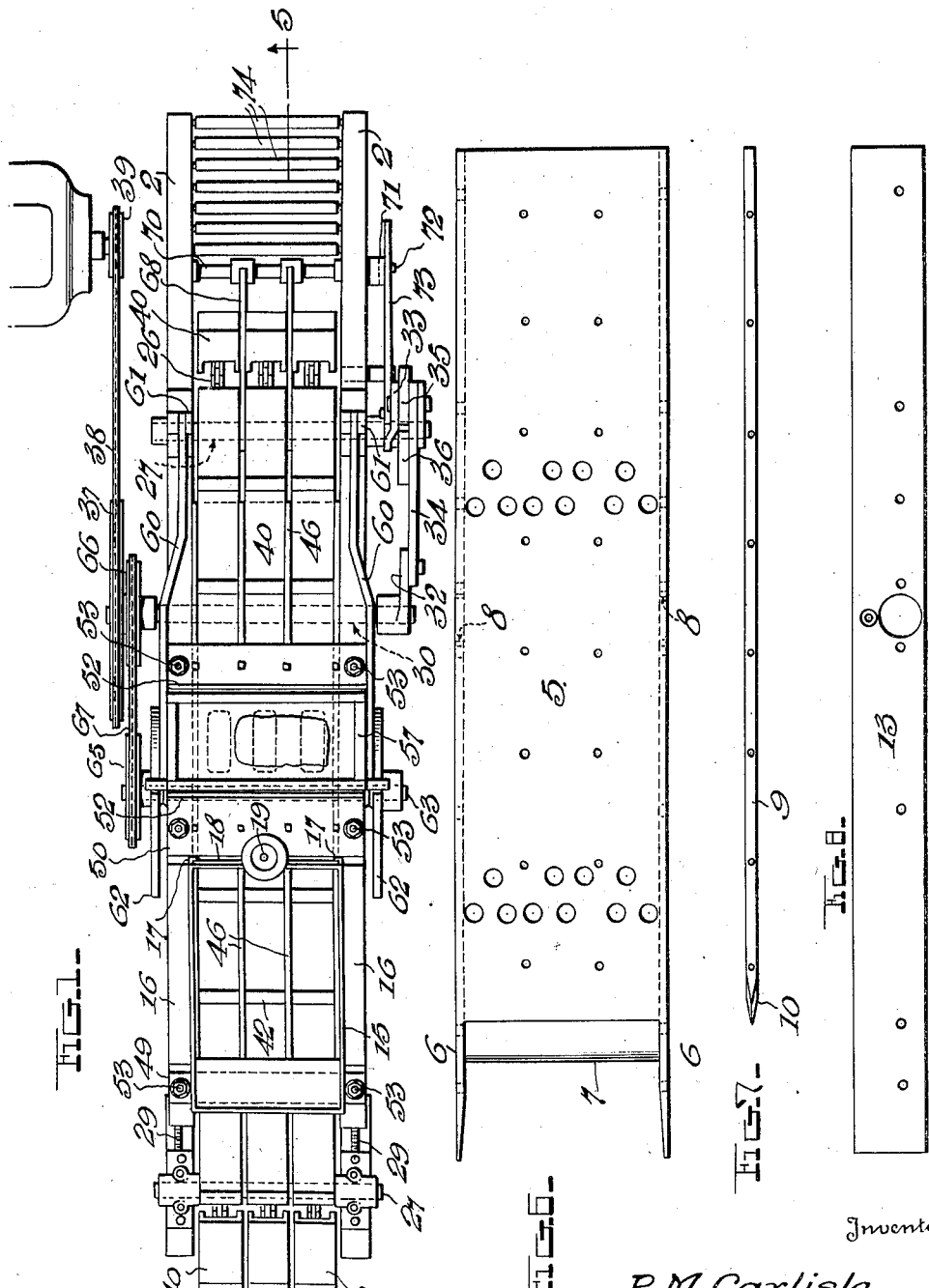
Inventor
P. M. Carlisle
By Albert F. Dieterich
Attorney

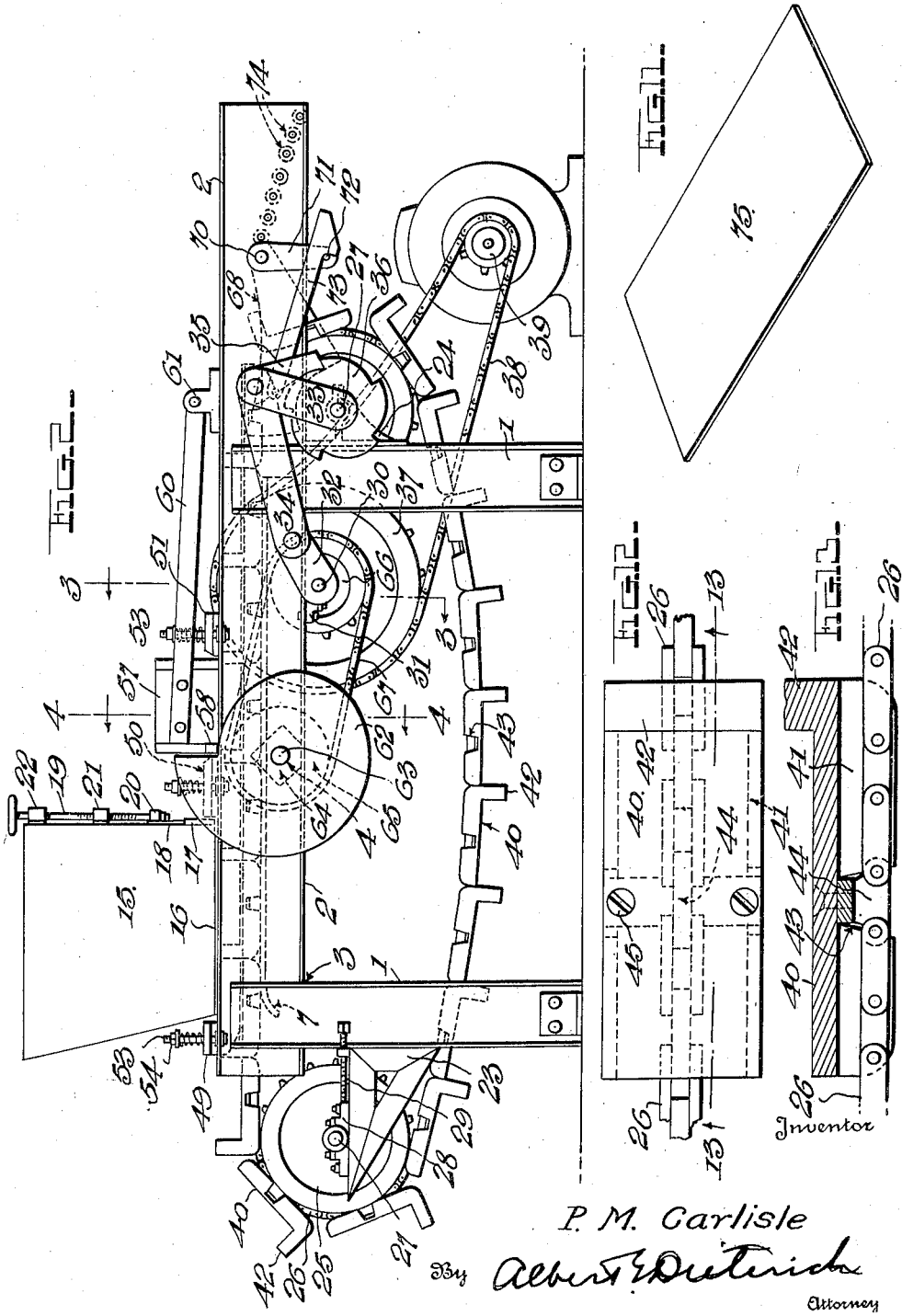

Jan. 4, 1938.  P. M. CARLISLE  2,104,293
BRICK AND TILE MACHINE
Filed Nov. 13, 1936   4 Sheets-Sheet 3
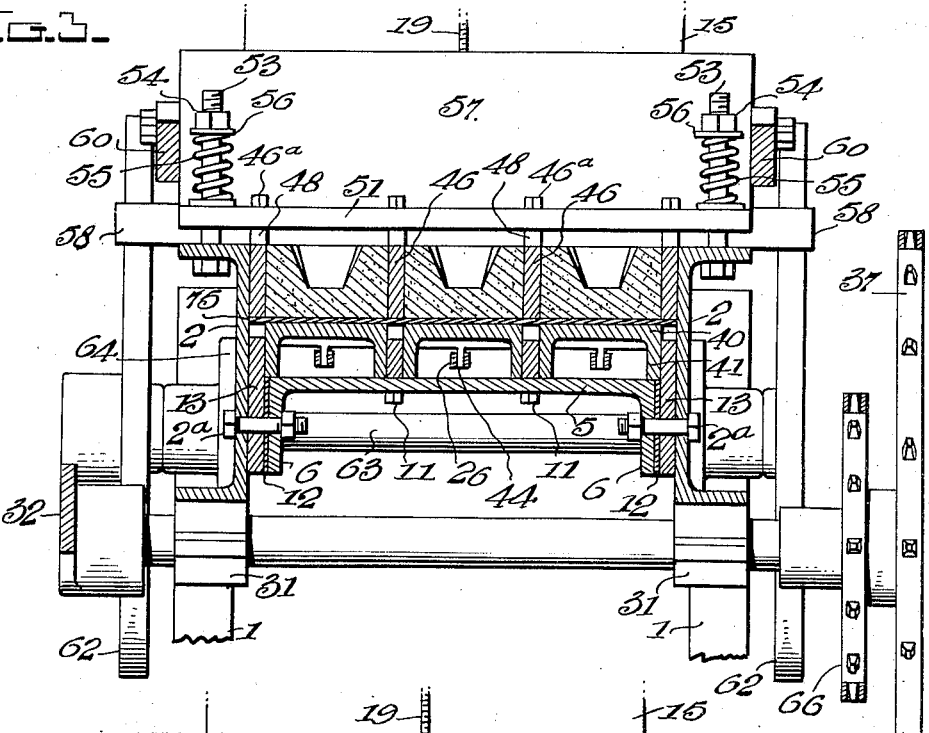
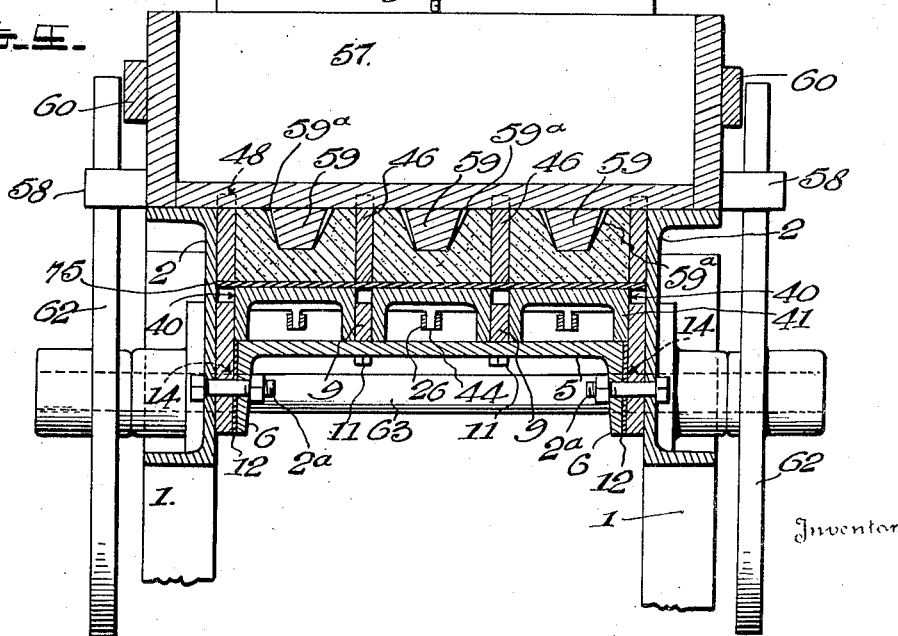
Inventor
P. M. Carlisle

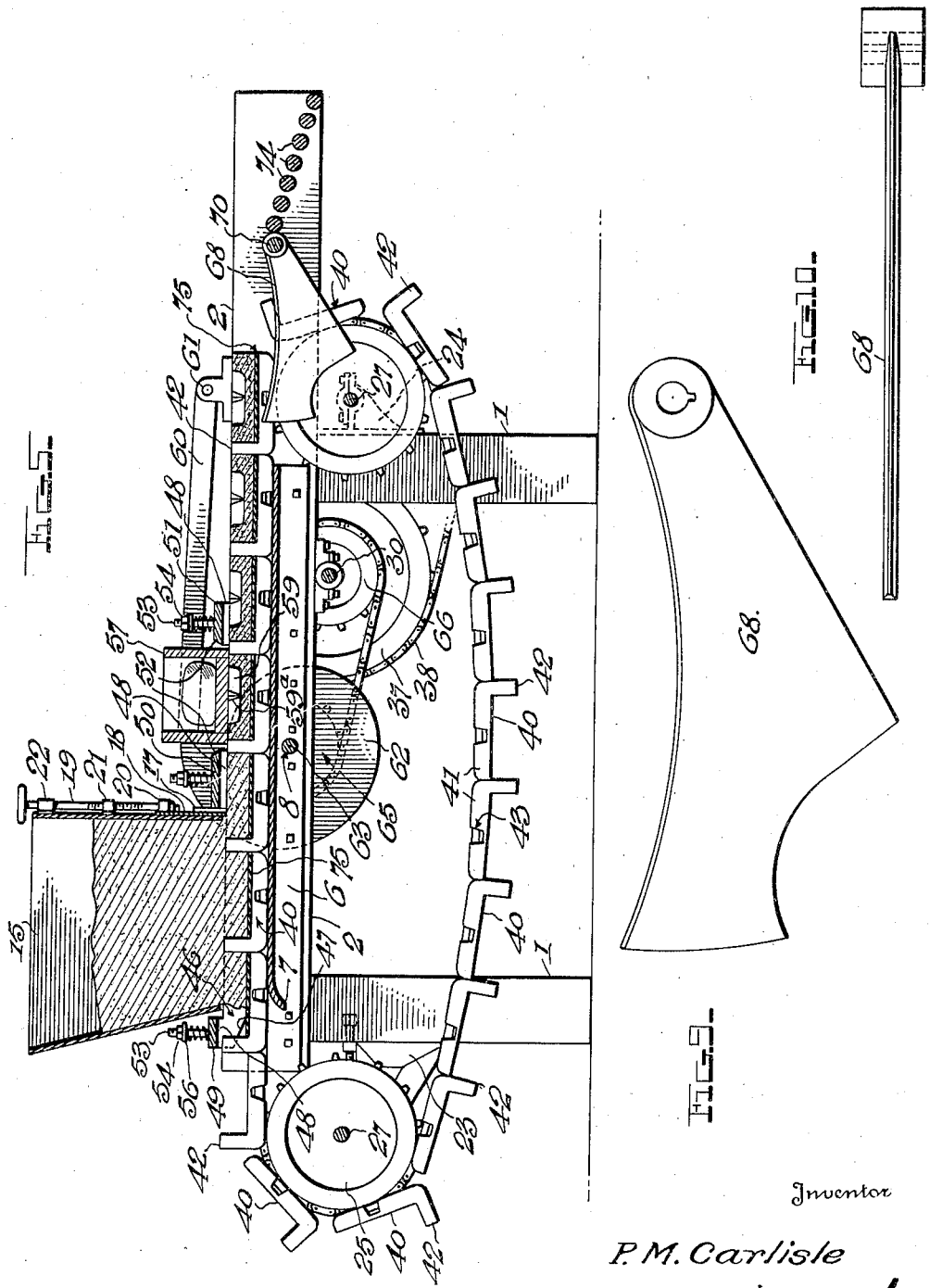

Patented Jan. 4, 1938

2,104,293

UNITED STATES PATENT OFFICE 2,104,293

BRICK AND TILE MACHINE

Pitt M. Carlisle, Panama City, Fla., assignor to Panama Brick & Tile Company, Panama City, Fla., a corporation of Florida Application November 13, 1936, Serial No. 110,729

16 Claims. (Cl. 25—100)

My invention relates to machines for the manufacturing of bricks and tiles, and it particularly has for its object to provide a machine to produce, by a continuous operation, pressed cement, brick or tile, from a semi-dry mix.

Another object is to provide a machine by the use of which the product is of uniform density on all faces, light in weight, and easy to handle.

Again it is an object to provide a machine of the character stated in which the brick or tile may be formed with a groove at its middle so that it will be easy for the bricklayer to break it in half.

A further object is to provide a machine with longitudinal dividing bars between which are channelways through which the pallets are conveyed and in which machine several separate rows of bricks or tiles may be made at the same time.

Further it is an object to provide a machine in which, also the narrow face side of each brick is trowelled to a smooth surface.

Again it is an object to provide a machine in which the dividing bars are removable, so that either a one, two or three brick unit, or tile (floor tile or shingle) may be made when desired.

Other objects will in part be obvious and in part generally pointed out hereinafter.

To the attainment of the aforesaid objects and ends, the invention still further resides in those novel details of construction, combination and arrangement of parts, all of which will be first fully described in the following detailed description, then be pointed out in the appended claims, reference being had to the accompanying drawings in which:—

Fig. 1 is a top plan view of the machine.

Fig. 2 is a side elevation of the same.

Fig. 3 is a cross section on the line 3—3 of Fig. 2.

Fig. 4 is a cross section on the line 4—4 of Fig. 2.

Fig. 5 is a vertical longitudinal section on the line 5—5 of Fig. 1.

Fig. 6 is a top plan view of the bed bottom.

Fig. 7 is a detail top plan view of one of the guide strips.

Fig. 8 is a detail side elevation of one of the side guides.

Fig. 9 is a detail side elevation on one of the discharge vanes.

Fig. 10 is a top plan view of the same.

Fig. 11 is a detail perspective view of one of the false pallets.

Fig. 12 is a detail plan view of a pallet showing how it may be fastened to the chain.

Fig. 13 is a section on the line 13—13 of Fig. 12.

In the drawings in which like numerals and letters of reference designate like parts in all the figures, I represents the standards or legs to which are attached the bed sides 2. The bed sides are preferably formed of channel irons and they have portions of their lower flanges cut away as at 3 to pass the standards I which are also preferably formed of channel irons. The standards and bed sides are secured together in any suitable way, preferably by bolting or welding.

The bed sides 2 have holes 4 for the passage of the cam shaft 63 and to receive the shaft bearings 64, the latter being bolted or otherwise secured to the sides 2.

The bed bottom 5 is composed of a plate having side flanges 6, the plate being slit and curved downwardly at its front end as at 7, holes 8 being provided in the flanges 6 for the shaft 63 to pass through. The bed bottom 5 may have a suitable number of well located holes for drainage of water squeezed out of the mix during the rammer's action.

Removably secured to the bed bottom 5 on its upper face are one or more longitudinal guide strips 9, the front ends of which are preferably bevelled, as at 10, for cooperating with the edge 7 to assure the smooth entry of the chain of pallets into the channels between the strips 9 on the bed bottom 5. Cap screws 11 (see Fig. 3) may be used removably to secure the strips 9 to the bed bottom 5. If found necessary or desirable, shims 12 may be employed between the flanges 6 and side guides 13 held against the bed sides 2 by bolts and nuts 2ª. The side guides 13 cooperate with the guide strip 9 to form channels or ways for the endless conveyor chains 26. The shims have holes 14 to pass the shaft 63.

The hopper 15 which supplies the mix to the pallets has flanges 16 by which it is secured to the bed sides 2. Its bottom is open and it has a shallow opening at the bottom of its rear wall, which opening is controlled by a gate 18 vertically adjustable in guides 17 by an adjusting screw 19 carried by an apertured unthreaded lug 22 and an apertured threaded lug 21. The lower end of the screw 19 is swivelly mounted in lug 20 on the gate 18.

Suitably constructed brackets 23, 24, at the front and rear ends of the machine carry the bearings for the shafts 27 of the endless chain of pallets.

The bearings of the rear shafts 27 are fixed but the shaft 26 at the front of the machine is carried in bearings 28 adjustably mounted on the brackets 23 and operated by a screw 29 as is well known. On the shafts 27 are sets of sprockets 25 around which the chains 26 pass, the chains having lugs 44 which fit into the recesses 43 in the side flanges 41 of the pallets 40 and to which lugs the pallets are secured by screw bolts 45.

At the rear or following ends the pallets have upstanding walls 42, the walls 42 of the adjacent pallets, together with floating trowels 46 constitute the molds for the reception of the mix.

Journalled in suitable bearings 31, secured to the under flange of the bed sides 2, is a crank shaft 30, which has a crank 32 on one end and sprockets 66 and 37 on the other end.

On the rear shaft 27 is a pawl arm 33, loosely mounted, which is oscillated by means of a rod 34 connecting it with the crank 32. A pawl 35 pivoted to the arm 33 engages, by gravity, a ratchet 36 fast on the rear shaft 27, in virtue of which rotation of the crank shaft 30 sets up a step by step motion in shafts 27 and chain 26. The shaft 30 is driven from a suitable motor having a sprocket 39 and chain 38 connection with sprocket 37.

The floating trowels 46, overlie the guides 9 and 13 and are removably mounted on trowel spacers 49, 50 and 51. Each trowel 46 comprises a flat bar having its front end 47 bevelled and being provided with lug portions 48 into which the securing screws 46ª are tapped. The opposed edges 52 of the spacers 50 and 51 are bevelled as best shown in Figs. 1 and 5 for a purpose later understood. The spacers 49, 50, 51 are in the nature of flat bars and they extend across the machine. The trowels 46 rest yieldingly on the guides 9 and 13 and are held in place by means of studs 53 secured to the bed sides 2 and pass through holes in the spacers 49, 50, 51. The studs carry tension springs 55, adjusting nuts 54 and washers 56 as shown.

For the purposes of compacting the mass within the molds and forming the brick or tile with depressions or recesses, I provide a rammer which comprises a box 57 that extends across the width of the machine and has side lugs 58 which project beyond the bed sides. Secured to the bottom of the box are suitable cores 59, preferably provided in their mid lengths with V-shaped projecting ribs 59ª which form grooves in the bricks that assist the mason in breaking the same in two.

The rammer box 57 may be weighted or loaded by any suitable means and it is carried by a pair of arms 60, pivoted at 61 to brackets fastened on the bed sides 2, at one end and bolted or otherwise secured to the box at its ends.

The box is alternately raised and lowered in time with the movements of the chain of pallets by means of two cams 62 on a shaft 63 that is journalled in bearing boxes 64 and is driven by a chain 67 passing over a sprocket 65 on shaft 63 and over the sprocket 66 on shaft 30.

At the rear of the machine is located the mechanism for removing the molded articles from the pallets and delivering the same from the machine. The discharging mechanism comprises a set of discharging vanes 68 on a shaft 70 pivotally mounted in the bed sides 2 of the machine. The vanes 68 normally lie in the spaces between adjacent pallet chains, in alignment with the guide 9, the upper edge of each vane being concaved and preferably bevelled. The vanes are raised to lift articles from the chain pallets by rocking the shaft 70. This is accomplished by a discharge arm 71 having a pin 72 over which is hooked an end of the discharge link which is pivoted to the pawl arm 33 and is operated thereby.

A set of offtake rollers 74 mounted between the bed sides 2 constitutes an inclined runway for delivering the articles from the machine.

Before the chain pallets 40 go under the hopper 15 a thin plate 75 constituting a false pallet is placed on each transverse row of pallets and these false pallets with the bricks, or tiles, thereon are removed by the vanes 68.

The bevelled edges 52 of the spacers 50 and 51 prevent the rammer box 57 from catching on the spacers as the box falls. In making flat tile, without depression, such as are used for wall facings, floor tiles, or shingles, the cores 59 are removed, (or if shallow depressions are desired, shallow cores are used).

As shown in the drawings the machine is designed to make three single unit bricks in a cross row. If a single brick and a two-brick unit is desired one of the intermediate trowels 46 is removed, or if a three-brick unit is desired both intermediate trowels 46 are removed. Thus with the same machine and at the same time an equal number of one and two brick units may be made.

Operation

The cement and sand mix is placed in the hopper 15, from which it feeds by gravity into the pallet molds as they are advanced, step-by-step, through the pawl and ratchet chain operating mechanism hereinbefore described. The floating trowels extend beneath the hopper beginning at the front end of the machine and extending to a place beyond the rammer box 57. As the pallets pass beneath the hopper they gather the mix and when they arrive beneath, the rammer box 57, which has been raised by the cams 62, is allowed to fall by its own weight, thus shaping and compacting the mix within the molds. Then before the chain moves again the cams 62 again raise the rammer box clear of the molds. As the pallets with their contents move along the length of the floating trowels or dividers, the trowel imparts a smooth finish to the smaller end or side of the brick. Any moisture which may be pressed out of the mix by the rammer, will drain away over the bed of the machine.

If a perforated brick is desired the cores on the rammer will be made of the required depth or the false pallets may have cores and the rammer box be provided with core receiving recesses as is well known in molding practice generally.

As the sets of bricks on the false pallets reach the rear end of the machine, the vanes 68 are slowly raised and the false pallets with their burdens are received from the chain-pallets and slid off onto the runway 74 and out of the machine onto a suitable conveyor (not shown) to be taken to the curing racks.

The particular machine which I have constructed and successfully operated in keeping with the present disclosure, is designed to make three standard size bricks at one time, or it may be adapted to make two or three brick-wide units, also by installing special adjustments or adapters hereinbefore described it can be used to make floor tile or cement shingles.

The cores on the bottom of the rammer being tapered or wedge shaped and the rammer being a heavy weight, when the rammer drops the mix is forced to all corners of the mold.

Recapitulation of the special advantages of this machine:—

1st. It has a step-by-step drive, so geared as to produce the exact number (30) of bricks per minute, or ten 3 brick tile, or ten shingle tile.

2nd. The same operation can produce either a one brick unit, two brick unit or three brick unit, or a shingle tile.

3rd. The pallets, being on a chain drive, are drawn, by the side walls of the unit molds (which are relatively stationary) and the bricks are thus trowelled, giving a smooth face to the brick or tile units.

4th. The pallets are attached to a chain drive, and made of cast steel but, a thin tin or iron false pallet is placed into the unit mold, before the aggregate is poured into the molds from the cement or aggregate hopper; this false pallet is discharged with the unit from the machine.

5th. When the brick or tile mold, filled with aggregate, reaches the position, a tamper descends from above; this tamper is constructed with a core, that presses down into the aggregate in the mold creating a void in the brick or tile. The amount of void created is equal to the amount of contraction in the loose aggregate in the mold created by a compression of 250 pounds per square inch.

6th. The raising and lowering of the rammer is done by a cam which raises the rammer and lets it fall ten times per minute.

7th. When the brick or tile unit is raised by the vane, the false pallet with the brick or tile resting on it is discharged on a set of rollers and conveyed by gravity to a belt conveyor which carries it to the car, to be conveyed by car to stack in shed.

8th. The action of the machine is controlled by a ratchet wheel drive that automatically stops the machine as the rammer descends upon the brick unit, but as the rammer lifts, the ratchet drive starts the machine again.

9th. The distinct advantage of this machine over others is in the fact that every unit is compressed to a maximum degree, the faces of the unit are trowelled perfectly, every unit is of machine precision as to size and voids.

10th. The void in the one brick unit consists of a single void created by the core of the tamper. The voids in the two brick and three brick tile units consist of the same voids as in the one brick unit, but also the tile units contain a void that goes entirely through the tile making a handhold whereby the mason can easily grasp a tile unit with one hand.

From the foregoing description taken in connection with accompanying drawings it is thought the construction, operation and advantages of the invention will be clear to those skilled in the art to which its appertains and while I have disclosed the preferred embodiment I wish it understood that I do not desire to be limited to the exact construction shown and described as many variations in the details can be made without departing from the spirit of the invention and the scope of the appended claims.

What I claim is:—

1. In a machine of the class described a plurality of parallelly disposed endless chains of pallets, sprocket shafts common to all chains, a bed bottom over and along which said chains pass, the pallets of each chain comprising a flat plate with an upright wall at its rear edge, a hopper for the mix located on the bed and over the pallets, floating trowels at the sides of said chains of pallets and constituting with the pallets molds into which the hopper delivers mix as the pallets pass beneath the hopper, a rammer cooperating with the molds after they have passed the hopper for condensing the mix and forming the articles in the molds, and means to discharge the contents of the molds from the machine.

2. In a machine of the class described a bed composed of a bed bottom and sides, means to support the bed, a set of guide strips secured to the bed bottom and dividing the bed into a plurality of parallel runways, endless chains of pallets and means to draw the same over the bed bottom in said runways in unison, said pallets each including a flat base and an upstanding flange at the rear of the base, a hopper for the mix located on said bed over said runways adjacent the entrant end of the same, floating trowels comprising strips secured to trowel spacers mounted for movement vertically and spring means continuously tending to move the trowel carriers downwardly, said trowel strips corresponding in number to and lying over said guide strips and extending beneath said hopper, said trowel strip constituting, with the pallets, the molds, in which the articles are formed, means for ramming the contents of the molds and forming the same into final form, and means to discharge the finished articles from the machine.

3. In a machine of the class described a bed composed of a bed bottom and sides, means to support the bed, a set of guide strips secured to the bed bottom and dividing the bed into a plurality of parallel runways, endless chains of pallets and means to draw the same over the bed bottom in said runways in unison, said pallets each including a flat base and an upstanding flange at the rear of the base, a hopper for mix located on said bed over said runways adjacent the entrant end of the same, floating trowels comprising strips secured to trowel spacers mounted for movement vertically and spring means continuously tending to move the trowel carriers downwardly, said trowel strips corresponding in number to and lying over said guide strips and extending beneath said hopper, said trowel strip constituting, with the pallets, the molds, in which the articles are formed, means for ramming the contents of the molds and forming the same into final form, said ramming means comprising a vertically movable box and cam means for lifting the box and then releasing it to fall by gravity, and means to discharge the finished articles from the machine.

4. In a machine of the class described a plurality of parallelly disposed endless chains of pallets, sprocket shafts common to all chains, a bed bottom over and along which said chains pass, the pallets of each chain comprising a flat plate with an upright wall at its rear edge, a hopper for the mix located on the bed and over the pallets, floating trowels at the sides of said chains of pallets and constituting with the pallets molds into which the hopper delivers mix as the pallets pass beneath the hopper, a rammer cooperating with the molds after they shall have passed the hopper for condensing the mix and forming the articles in the molds, and means to discharge the contents of the molds from the machine and false pallets carried by each transverse set of chain pallets.

5. In a machine of the class described a bed composed of a bed bottom and sides, means to support the bed, a set of guide strips secured to the bed bottom and dividing the bed into a plurality of parallel runways, endless chains of pallets and means to draw the same over the bed bottom in said runways in unison, said pallets each including a flat base and an upstanding flange at the rear of the base, a hopper for mix located on said bed over said runways adjacent the entrant end of the same, floating trowels comprising strips secured to trowel spacers mounted for movement vertically and spring means continuously tending to move the trowel carriers downwardly, said trowel strips corresponding in number to and lying over said guide strips and extending beneath said hopper, said trowel strips constituting, with the pallets, the molds, in which the articles are formed, means for ramming the contents of the molds and forming the same into final form, and means to discharge the finished articles from the machine, and false pallets carried by each transverse set of chain pallets.

6. In a machine of the class described a plurality of parallelly disposed chains of pallets, passing along a bed in laterally spaced relations, false pallets extending across the pallets of all chains and over the spaces between chains, whereby one false pallet will contain a finished article from each chain as the same arrives adjacent the discharge end of the machine; means projecting into the spaces between adjacent chains of pallets to remove the false pallets with their burdens from the chain pallets and deliver the same from the machine.

7. In a machine of the class described a plurality of parallelly disposed chains of pallets, passing along a bed in laterally spaced relations, false pallets extending across the pallets of all chains and over the spaces between chains, whereby one false pallet will contain a finished article from each chain as the same arrives adjacent the discharge end of the machine; means to remove the false pallets with their burdens from the chain pallets and deliver the same from the machine, said last named means comprising discharging vanes located in the spaces between adjacent chains of pallets and below the false pallets, and means to operate said vanes.

8. In a machine of the class described a plurality of parallelly disposed chains of pallets, passing along a bed in laterally spaced relations, false pallets extending across the pallets of all chains and over the spaces between chains, whereby one false pallet will contain a finished article from each chain as the same arrives adjacent the discharge end of the machine; means to remove the false pallets with their burdens from the chain pallets and deliver the same from the machine, said last named means comprising discharging vanes located in the spaces between adjacent chains of pallets and below the false pallets, and means to operate said vanes and an inclined runway onto which the vanes deliver the false pallets with their burdens.

9. In a machine of the class described a plurality of parallelly disposed chains of pallets, passing along a bed in laterally spaced relations, false pallets extending across the pallets of all chains and over the spaces between chains, whereby one false pallet will contain a finished article from each chain as the same arrives adjacent the discharge end of the machine; means to remove the false pallets with their burdens from the chain pallets and deliver the same from the machine, said last named means comprising pivotally mounted discharging vanes located in the spaces between adjacent chains of pallets and below the false pallets, and means to rock said vanes on their pivots to lift said false pallets and slide them out of the machine.

10. In a machine of the class described a bed composed of sides and a bottom, legs for supporting the bed, side guides extending above the level of the bed bottom and guide strips secured to the top of the bed bottom, said guides and guide strips constituting with the bed bottom a plurality of longitudinal channels or runways, an endless chain of pallets operating along each runway, means to move all of said chains, step-by-step in unison with their pallets in transverse alignment, a false pallet carried by each transverse row of pallets, the chain pallets each comprising a flat plate having an upright flange at its rear edge, trowels comprising strips located directly above said guides and guide strips and over said false pallets and constituting with said chain pallets molds for the reception of mix, a rammer with cores common to all said chains of pallets for simultaneously ramming the contents of all molds in a transverse row, means to operate the rammer and means to engage the false pallets and remove them with their burdens from the chain pallets and deliver them from the machine.

11. In a machine of the class described a bed composed of sides and a bottom, legs for supporting the bed, side guides extending above the level of the bed bottom and guide strips secured to the top of the bed bottom, said guides and guide strips constituting with the bed bottom, a plurality of longitudinal channels or runways, an endless chain of pallets operating along each runway, means to move all of said chains, step-by-step in unison with their pallets in transverse alignment, a false pallet carried by each transverse row of pallets, the chain pallets each comprising a flat plate having an upright flange, at its rear edge, trowels comprising strips located directly above said guides and guide strips and over said false pallets and constituting with said chain pallets molds for the reception of mix, a rammer with cores common to all said chains of pallets for simultaneously ramming the contents of all molds in a transverse row, means to operate the rammer and means to engage the false pallets and remove them with their burdens from the chain pallets and deliver them from the machine, and means for floatingly mounting said trowels.

12. In a machine of the class described, an endless chain, sprockets for supporting the same, said chain at intervals having lugs, pallets each comprising a plate having side flanges with recesses to fit over said lugs with the chain located between the flanges, means securing the pallet plates to said lugs, said pallet plates having upstanding flanges at the rear edges, and the pallets being located in proximity whereby the rear flange of one pallet will form a front for the next rearward pallet, a bed over which said chain passes, and stationarily located floatingly mounted trowels constituting sides for the pallets, the trowels and pallets constituting molds while the pallets are passed along the bed.

13. In a machine of the class described a bed composed of sides and a bottom, legs for supporting the bed, side guides extending above the level of the bed bottom and guide strips secured to the top of the bed bottom, said guides and guide strips constituting with the bed bottom a plurality of longitudinal channels or runways, an endless chain of pallets operating along each runway, means to move all of said chains, step-bystep in unison with their pallets in transverse alignment, a false pallet carried by each transverse row of pallets, the chain pallets each comprising a flat plate having an upright flange, at its rear edge, trowels comprising strips located directly above said guides and guide strips and over said false pallets and constituting with said chain pallets molds for the reception of mix, a rammer with cores common to all said chains of pallets for simultaneously ramming the contents of all molds in a transverse row, means to operate the rammer and means to engage the false pallets and remove them with their burdens from the chain pallets and deliver them from the machine and a hopper disposed over the bed for delivering mix to the pallet-molds as they are passed beneath the hopper.

14. In a machine of the class described, an endless chain, sprockets for supporting the same, said chain at intervals having lugs, pallets each comprising a plate having side flanges with recesses to fit over said lugs with the chain located between the flanges, means securing the pallet plates to said lugs, said pallet plates having upstanding flanges at the rear edges, and the pallets being located in proximity whereby the rear flanges of one pallet will form a front for the next rearward pallet, a bed over which said chain passes, and stationarily located floatingly mounted trowels constituting sides for the pallets, the trowels and pallets constituting molds while the pallets are passed along the bed, a hopper disposed over the bed for delivering mix to the pallet-molds as they are passed beneath the hopper, and a rammer for ramming the mix in the pallet-molds after they pass from beneath the hopper.

15. In a machine of the class described a bed divided into a plurality of parallel longitudinal runways, a pallet-chain movable, one along each runway, means to move the chains in unison with their pallets in transverse alignment, a single rammer common to all chains and comprising a vertically movable box having on its bottom a core for each chain of pallets, and means to raise and then suddenly release said box for purposes described, and means to guide said box in its movements.

16. In a machine of the class described, a chain of pallets and side trowels constituting molds, means to deliver mix to said molds at one place, means to form and compact the mix at another place and comprising a rammer having cores on its bottom to indent the mix in the mold, the cores having ribs to form weakened places in the brick at which the finished brick may be conveniently broken in two by the mason.

PITT M. CARLISLE.